United States Patent
Dewan et al.

(10) Patent No.: US 12,445,268 B2
(45) Date of Patent: Oct. 14, 2025

(54) CLUSTER-WIDE ROOT SECRET KEY FOR DISTRIBUTED NODE CLUSTERS

(71) Applicant: Microsoft Technology Licensing, LLC, Redmond, WA (US)

(72) Inventors: Prashant Dewan, Portland, OR (US); Andreea Mihaela Pintilie, Cambridge (GB); Mark Andrew Cawston, King's Lynn (GB); Kaloyan Aleksandro Aleksiev, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 18/344,394

(22) Filed: Jun. 29, 2023

(65) Prior Publication Data
US 2025/0007735 A1    Jan. 2, 2025

(51) Int. Cl.
*H04L 9/08* (2006.01)
*H04L 9/14* (2006.01)
*H04L 9/32* (2006.01)

(52) U.S. Cl.
CPC ............ *H04L 9/0816* (2013.01); *H04L 9/085* (2013.01); *H04L 9/0861* (2013.01); *H04L 9/14* (2013.01); *H04L 9/3268* (2013.01)

(58) Field of Classification Search
CPC .................................................... H04L 9/0816
See application file for complete search history.

(56) References Cited

U.S. PATENT DOCUMENTS

2009/0245518 A1*  10/2009  Bae ..................... H04L 63/065
                                                     713/161
2013/0117567 A1    5/2013  Chang
2020/0259646 A1*  8/2020  Kwak .................... G06F 21/57
2023/0214364 A1*  7/2023  Fan ..................... G06F 16/134
                                                     707/827
2024/0259194 A1*  8/2024  Matthews, Jr. ....... H04L 9/0822

FOREIGN PATENT DOCUMENTS

WO        2023278851 A1     1/2023

OTHER PUBLICATIONS

International Search Report and Written Opinion received for PCT Application No. PCT/US2024/034567, mailed on Oct. 9, 2024, 12 pages.
Schear, et al., "Bootstrapping and maintaining trust in the cloud", ACSAC, Dec. 2016, pp. 65-77.

* cited by examiner

*Primary Examiner* — Bradley W Holder

(57) ABSTRACT

Systems and methods are provided for implementing a cluster-wide root secret ("CWRS") key for distributed node clusters. In a multi-node cluster, a leader node has a leader node security system that generates the CWRS key, which is a common secret key for all workloads (e.g., containers or VMs) in the multi-node cluster. The leader node security system encrypts the generated CWRS key using a public key and/or a bootstrap key received from a non-leader node that requests the CWRS key. In examples, the leader node security system signs the encrypted CWRS key using its private key for subsequent verification, by the requesting non-leader node, that the CWRS key was generated by the leader node security system. The CWRS thus encrypted can be securely sent to the requesting non-leader node for subsequent encryption or decryption of secret data by the security system of the non-leader node.

20 Claims, 8 Drawing Sheets

CLUSTER-WIDE ROOT SECRET KEY FOR DISTRIBUTED NODE CLUSTERS

BACKGROUND

In distributed clusters of nodes, nodes in the cluster of nodes utilize secret keys to encrypt and decrypt data including secret data. Such secret keys, however, are by nature node-specific and are not shared or synchronized across nodes, making scaling untenable and replacement of non-working nodes unworkable. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for a cluster-wide root secret ("CWRS") key for distributed node clusters. In a multi-node cluster, a leader node has a leader node security system that generates the CWRS key, which is a common secret key for all workloads (e.g., containers, virtual machines ("VMs"), servers, or databases or data stores) in the multi-node cluster. The leader node security system encrypts the generated CWRS key using a public key and/or a bootstrap key that are received from a non-leader node that is requesting the CWRS key. In examples, the leader node security system signs the encrypted CWRS key using its private key for subsequent verification, by the requesting non-leader node, that the CWRS key was generated by the leader node security system. The CWRS thus encrypted can be securely sent to the requesting non-leader node for subsequent encryption or decryption of secret data by the security system of the non-leader node, the secret data being transferred, migrated, or stored within the multi-node cluster.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1:
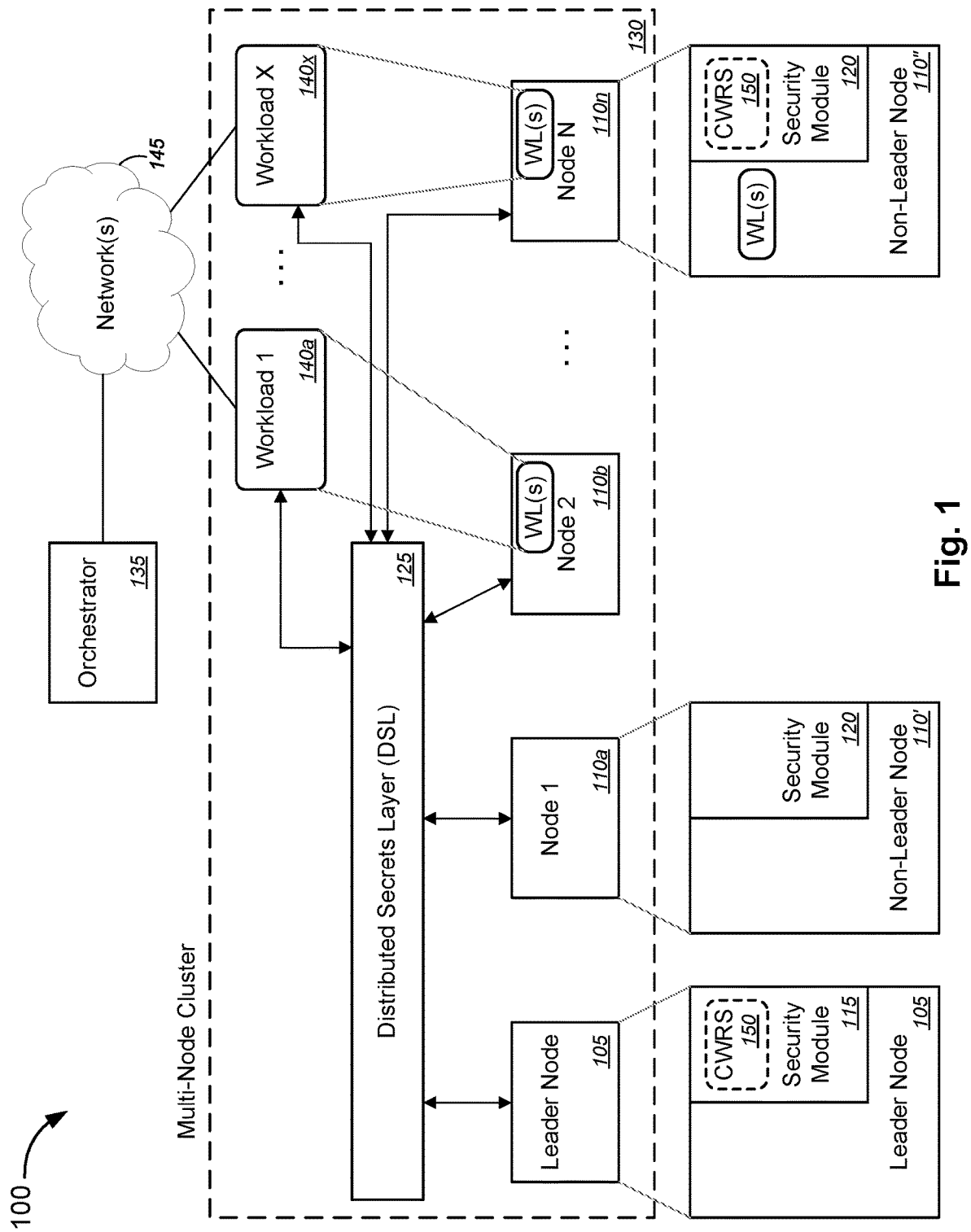
FIG. 1 depicts an example system for implementing a cluster-wide root secret ("CWRS") key for distributed node clusters.

In distributed clusters of nodes, like Kubernetes® clusters, the nodes in the multi-node clusters can be constituted from distinct virtual machines ("VMs") running disparate operating systems or physically separate servers running disparate VMs. Many of the workloads (commonly containers or VMs) running on nodes in a multi-node cluster require a root secret key from the multi-node cluster to encrypt their own secrets to produce ciphertext. Once encrypted, the ciphertext is either stored in some distributed data store or a cloud storage such that the cipher text is accessible to the workload from any node in the multi-node cluster. For example, in a Hypertext Transfer Protocol ("HTTP") server-database workload combination, the HTTP server needs a root secret key (secured in hardware) to encrypt secret data (e.g., a login and a password) of the data store and to securely save the encrypted secret data. To support resilience and recovery, these workloads are not bound to a single node, and can be stopped and started on any node in the multi-node cluster by an orchestrator (e.g., a Kubernetes® application programming interface ("API") server). As a result, storing the root secrets in a hardware store (e.g., a trusted platform module ("TPM") or other security controller) becomes challenging, since security controllers are bound to a single node by nature.

In examples, a distributed secrets layer ("DSL") is used to share a common secret key (referred to herein as a cluster-wide root secret ("CWRS") key; e.g., a common private key) across nodes and to periodically refresh the common secret key. A leader node security system generates the CWRS key for all nodes in the multi-node cluster. Once generated, the CWRS key is shared, by the DSL, with the other security systems in non-leader nodes in the multi-node cluster such that only the security systems of the nodes in the cluster node can access the CWRS key. Software (including the DSL) running on the nodes cannot read or write the CWRS key. Any workload requesting protection of workload secrets or secret data makes a request to the DSL, and the DSL in turn requests a local security system to encrypt or decrypt the workload secrets or secret data. One common CWRS, as opposed to a different root secret key for each node in the multi-node cluster, allows workloads to be torn down on one node and brought up on another node while still being able to access their previously encrypted secret data (e.g., secrets data that was encrypted on the previous node), thus providing for seamless migration of workloads.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of a method, system, and apparatus for implementing distributed node clusters, and, more particularly, to methods, systems, and apparatuses for implementing a CWRS key for distributed node clusters, as referred to above. The methods, systems, and apparatuses illustrated by FIGS. 1-5 refer to examples of different embodiments that include various components and steps, which can be considered alternatives, or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing a CWRS key for distributed node clusters. System 100 includes a leader node 105 and a plurality of non-leader nodes 1 through N 110a-110n (collectively, "non-leader nodes 110," "follower nodes 110," or "nodes 110"). Each node (including leader node 105 and nodes 110) includes a security system. For instance, leader node 105 includes security system 115, while each non-leader node 110 includes security system 120. System 100 further includes a DSL 125. The leader node 105 and the plurality of non-leader nodes 110 may be part of a multi-node cluster 130. In some cases, the DSL 125 may also be part of the multi-node cluster 130. System 100 may further include orchestrator 135 and one or more workloads 1 through X 140a-140x (collectively, "workloads 140"), where N (or n) and X (or x) are non-negative integer numbers that may be either the same as or different from each other. Workloads 140—which may include containers, VMs, servers, or databases or data stores—may be implemented or run on one or more of the non-leader nodes 110 or may be communicatively coupled to the one or more of the non-leader nodes 110. A container, as used herein, refers to a logical packaging in which software applications can be abstracted from the environment in which they are actually run or executed, by holding all the components (e.g., files, libraries, and environment variables) necessary for running or executing the software applications. A VM, as used herein, refers to a virtual computer system that emulates the functionality of a physical computer. In examples, each node 105 or 110 is a machine where containers or workloads are deployed, where the machine is either a physical computing system or a virtual computing system. In some examples, a multi-node cluster 130 is a group of servers (e.g., application servers) that are managed together and participate in workload management.

In FIG. 1, non-leader nodes 110' include nodes on which workloads are either inactive or not implemented or run, while non-leader nodes 110" include nodes on which workloads are implemented or run. The orchestrator 135 includes a server (e.g., an API server such as a Kubernetes® API server, Docker® Swarm Manager, Mesos® Master, or HashiCorp® Nomad® Server). The orchestrator 135 is configured to manage or control the workloads 140, including to send commands to start or stop the workloads 140. In some examples, orchestrator 135 may communicatively couple with workloads 140 and/or nodes 110 via network(s) 145. In examples, network(s) 145 includes at least one of a distributed computing network, such as the Internet, a private network, a commercial network, an enterprise network, or a cloud network, and/or the like.

Security system 115 of leader node 105 may generate a CWRS key 150. Security system 115 may securely distribute the CWRS key 150 to any of the one or more security systems 120 of corresponding non-leader nodes 110 that request the CWRS key 150, in a manner as described below with respect to FIG. 3A. The CWRS key 150 may be stored either within the security system 115 or 120 (as depicted in FIG. 1 by the dash-lined rounded blocks denoted "CWRS 150") or within a local data store (not shown) that is only accessible by security system 115 or 120. Alternatively or additionally, leader node 105, security system 115, and/or DSL 125 may securely distribute the CWRS key 150 to each of one or more non-leader nodes among the plurality of non-leader nodes 110a-110n or the security systems 120 of each corresponding non-leader node 110, in a manner similar to the example sequence flow 300A of FIG. 3A. In some examples, security system 115 or 120 includes a TPM, which is a hardware device (e.g., a computer chip or microcontroller) or a virtual device that is configured to securely store artifacts or other data, and in some cases includes a secure crypto processor that secures hardware through use of integrated cryptographic keys. In examples, the CWRS key 150 is a common key that is used by the nodes 105 or 110 in the multi-node cluster 130 to encrypt or decrypt secret data (in a manner similar to the example sequence flow 300B of FIG. 3B or 300C of FIG. 3C, respectively), the CWRS key 150 being accessible only by the leader node security system 115 and security systems 120 of each non-leader node 110. In some examples, the CWRS key 150 is updated (e.g., refreshed, replaced, regenerated, or otherwise changed) in a manner that is in response to a condition being satisfied, in response to a user-initiated trigger, periodic, or random. In examples, the condition includes an event trigger including new nodes being added to the multi-node cluster, at least one existing node within the multi-node cluster changing in state or status (e.g., being deactivated, spun down, spun up, placed on stand-by, or rebooted), or communications links with at least one node within the multi-node cluster changing in state or status (e.g., new communication link being brought up to connect with at least one node, an existing communication link being brought down, an existing communication link being attacked, or attacks being perpetrated or attempted over an existing communication link). In examples, the user-initiated trigger includes a user command to update the CWRS key or a user command that initiates one of the above-mentioned conditions. In some examples, periodic updating includes updating over any suitable period including milliseconds, 10s of millisecond, 100s of milliseconds, seconds, 10s of seconds, 100s of seconds, minutes, hours, days, weeks, or months. In some examples, random updating includes updating based on any suitable randomization algorithm. In another example, a CWRS key may be set to expire after a set period or after a set number of uses. After the CWRS key expires, the non-leader node may be triggered to request a new CWRS key. In some examples, the expiration of the CWRS key is a trigger condition. After the CWRS key has been updated, a message may be sent to the plurality of non-leader nodes 110 that the CWRS key has been updated, thus indicating that such updated CWRS key should be requested from the security system 115. The CWRS key or common key, as used herein, refers to a piece of information or a framework that is common to all of the nodes within the multi-node cluster and that is used to decrypt and encrypt messages, particularly in symmetric cryptography.

Figure 2:
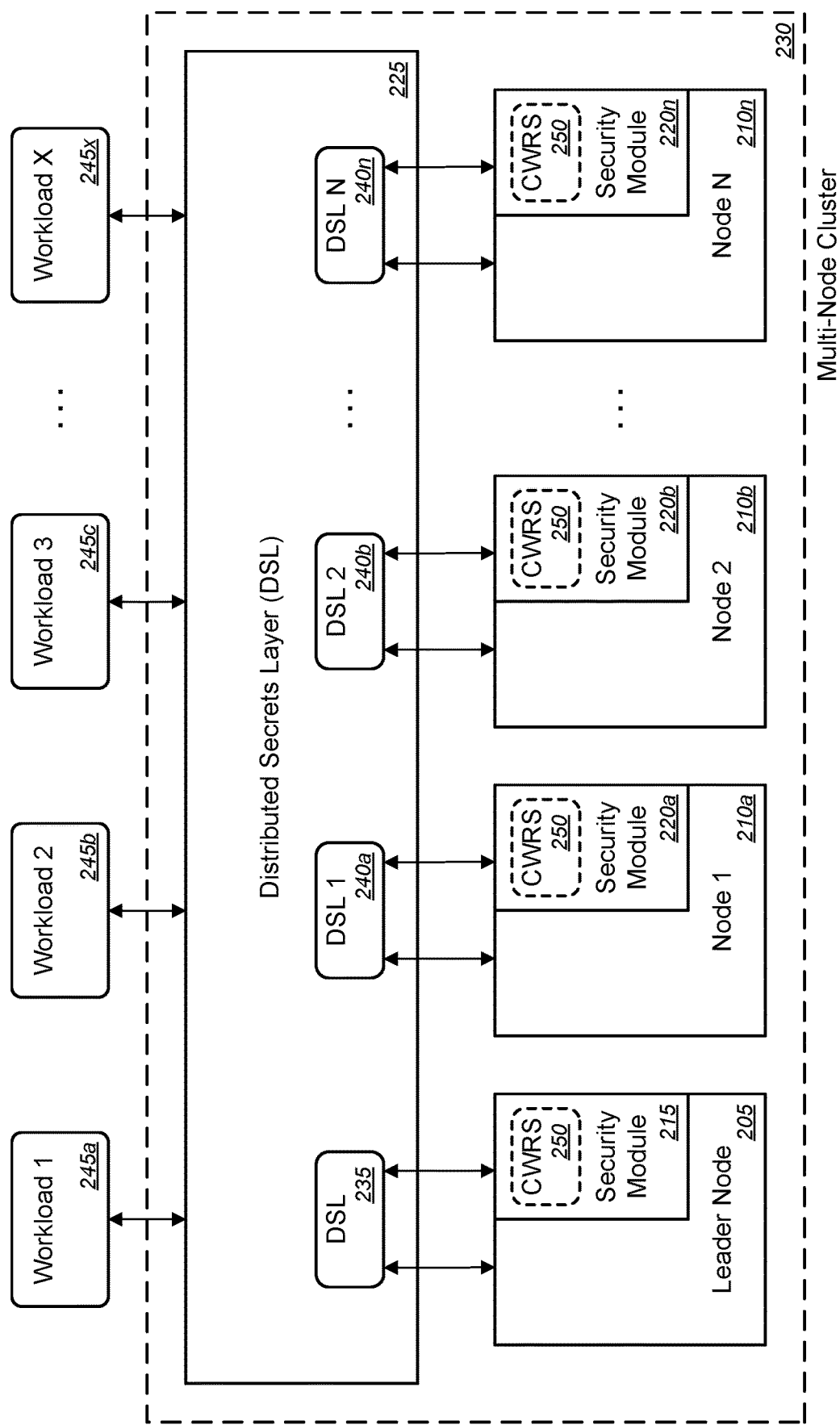
FIG. 2 depicts a block diagram illustrating an example data flow using a distributed secrets layer ("DSL") for implementing a CWRS key for distributed node clusters.

FIG. 2 depicts a block diagram illustrating an example data flow 200 using a DSL for implementing a CWRS key for distributed node clusters. In FIG. 2, leader node 205 includes security system 215, while a plurality of non-leader nodes 210a-210n (collectively, "non-leader nodes 210" or "nodes 210") includes a corresponding plurality of security systems 220a-220n (collectively, "security systems 220"). In some examples, DSL 225 includes DSL instance 235 and one or more DSL instances 1 through N 240a-240n (collectively, "DSL instances 240"). The leader node 205 and the plurality of non-leader nodes 210 may be part of a multi-node cluster 230. In some cases, the DSL 225 may also be part of the multi-node cluster 230. In examples, leader node 205 and/or security system 215 communicatively couples with one or more workloads 1 through X 245a-245x (collectively, "workloads 245") and/or with one or more non-leader nodes 210a-210n, via DSL 225 and/or DSL instance 235. In an example, workloads 245a-245x are run on one or more of non-leader nodes 210a-210n. In another example, some of workloads 245a-245x are run on one or more of non-leader nodes 210a-210n, while other ones of workloads 245a-245x are run on devices (not shown) that are external to nodes 205 or 210. Similarly, each non-leader node 210 and/or corresponding security system 220 communicatively couples with one or more workloads 245, the leader node 205, and/or one or more other non-leader nodes 210, via DSL 225 via one of the DSL instances 240a-240n.

Referring to FIG. 2, and similar to the example sequence flow 300A as described below with respect to FIG. 3A, security system 215 generates a CWRS key 250, and stores the generated CWRS key 250 in security system 215 (as depicted in FIG. 2 by the dash-lined rounded blocks denoted "CWRS 250") and/or in a secure data store (not shown). The CWRS key 250, like CWRS key 150 of FIG. 1, is a common key that is used by nodes in a multi-node cluster (e.g., leader node 205 and one or more of non-leader nodes 210a-210n) or more specifically their corresponding security systems 215 and/or 220 to encrypt or decrypt secret data, the CWRS key 250 being accessible only by the leader node security system 215 and corresponding one or more security systems 220a-220n of each of the one or more non-leader nodes 210a-210n. The CWRS key 250 may be shared with the one or more security systems 220a-220n, e.g., based on the example sequence flow 300A of FIG. 3A.

In operation, once the CWRS key 250 has been securely shared with the security systems 220 in the multi-node cluster, the security system can use the CWRS key to encrypt or decrypt secret data (e.g., based on the example sequence flow 300B of FIG. 3B or the example sequence flow 300C of FIG. 3C, respectively) in response to requests received from one or more workloads 245a-245x, via DSL 225 (and DSL components 235 and 240a-240n). In an example, the process of sharing, via DSL 225 (and DSL components 235 and 240a-240n) and as described with respect to FIG. 3A below, is repeated each time the CWRS key 250 is updated (e.g., refreshed, replaced, or regenerated). In another example, a non-leader node need not rejoin with the multi-node cluster when the CWRS key has been updated, but can continue to use a bootstrap key (which is received by the non-leader node when it first joined the multi-node cluster and which is subsequently sent to the leader node to be used to encrypt the CWRS) to remain within the multi-node cluster.

Figure 3A:
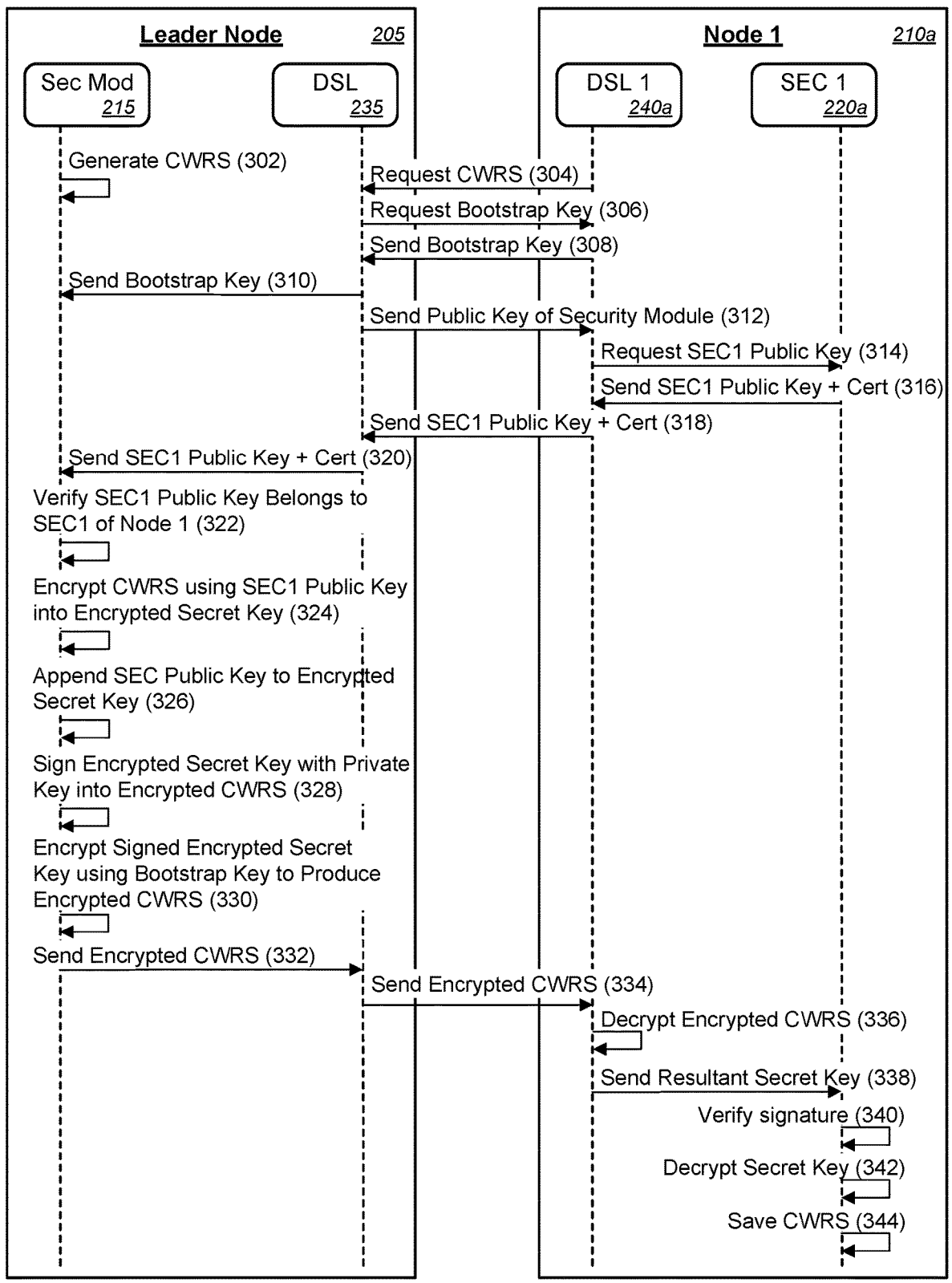
FIG. 3A depicts an example sequence flow for generating, encrypting, and sending a CWRS to a non-leader node in a multi-node cluster while implementing the CWRS key for distributed node clusters.

FIG. 3A depicts an example sequence flow 300A for generating, encrypting, and sending a CWRS key to a non-leader node in a multi-node cluster while implementing the CWRS key for distributed node clusters. At operation 302, a security system 215 of leader node 205 generates a CWRS key. At operation 304, a first non-leader node 210a in the multi-node cluster requests the CWRS key, via DSL 235 and DSL 1 240a. At operation 306, in response to the CWRS key request (at operation 304), the leader node 205 requests a bootstrap key from the first non-leader node 210a, which sends back the bootstrap key (at operation 308). Once received, the DSL 235 sends or relays the bootstrap key to the security system 215 (at operation 310). Every node, when it joins a multi-node cluster, receives the bootstrap key (e.g., $K_m$, where m=1 to n) that it later sends to the leader node for use in encrypting the CWRS key for the CWRS key to be transmitted in encrypted form back to the requesting non-leader node. The bootstrap key ($K_m$), in addition to being used to encrypt the CWRS key, indicates that an administrator has added the node 210 into the multi-node cluster. In examples, every multi-node cluster has a leader node, which is responsible for bootstrapping other nodes to the multi-node cluster. Bootstrapping, as used herein, refers to a process of adding or joining each node to the multi-node cluster. At operation 312, the leader node 205 sends, via DSL 235, a public key of the security system 215, and requests a public key of security system ("SEC 1") 220a of non-leader node 210a, which is sent or relayed by DSL 1 240a (at operation 314). At operation 316, SEC 1 220a sends a SEC 1 public key and a certificate to DSL 1, which sends or relays the SEC 1 public key and the certificate to DSL 235 (at operation 318), which sends or relays the SEC 1 public key and the certificate to security system 215 (at operation 320). Every node 210 generates a private-public key pair, where the private key ($Pr_m$) is stored in the security system 215 (e.g., a TPM or other security controller) of said node 210, while the public key ($Pu_m$) is exported out of the security system 215. The public key generated by the security system has a certificate chained to a well-known certificate authority ("CA"), the certificate allowing any verifier to verify that the public key actually belongs to a particular security system and is not an arbitrary public key.

At operation 322, security system 215 verifies that the received SEC 1 public key belongs to, or is associated with, security system 220a and/or non-leader node 210a, in some cases, by using the received certificate. In examples, the certificate indicates that a private key corresponding the received SEC 1 public key is embedded within SEC 1 220a. Provided the received SEC 1 public key is verified, security system 215 produces an encrypted secret key by encrypting the generated CWRS key using the SEC 1 public key (at operation 324). Security system 215 produces encrypted CWRS key by appending its public key (e.g., a leader node public key) to the encrypted secret key (at operation 326) and by signing the encrypted secret key (with the appended leader node public key) with a private key (at operation 328). At operation 330, security system 215 produces encrypted CWRS key by encrypting the signed encrypted secret key using the bootstrap key from the first non-leader node 210a. The security system 215 sends the encrypted CWRS key to the first non-leader node 210a to DSL 235 (at operation 332), which sends or relays the encrypted CWRS key to DSL 1 240a (at operation 334). At operation 336, DSL 1 240a and/or the first non-leader node 210a decrypts the encrypted CWRS key, using its bootstrap key, and sends the resultant secret key to SEC 1 220a (at operation 338). SEC 1 220a verifies a signature of the secret key (at operation 340), and, if verified, decrypts the secret key (at operation 342), and saves the CWRS key (at operation 344) in a local data store accessible only to SEC 1 220a.

In the manner described above, by encrypting the CWRS key with the public key of the security system 220a and the bootstrap key of node 210a, only the security system 220a of node 210a (using its private key) can later decrypt the encrypted CWRS key, thereby enhancing security of transfer of the encrypted CWRS key between the leader node 205 and the node 210a. Even if intercepted, the encrypted CWRS key would be difficult to break without first obtaining the private key of the security system 220a and the bootstrap key of node 210a. Verifying that the signature of the private key of the security system 215 that is used to sign the encrypted secret key (which is produced by using the SEC 1 public key to encrypt the CWRS key) belongs to the security system 215 of leader node 205 further enhances the security of the CWRS key, thereby preventing spoofed or false CWRS key. Overall, the process described in the example sequence flow 300A ensures the security of the common secret key (i.e., the CWRS key), by allowing use of the CWRS key in encrypting and decrypting secret data only at security systems of the nodes 210 within the multi-node cluster.

Figure 3B:
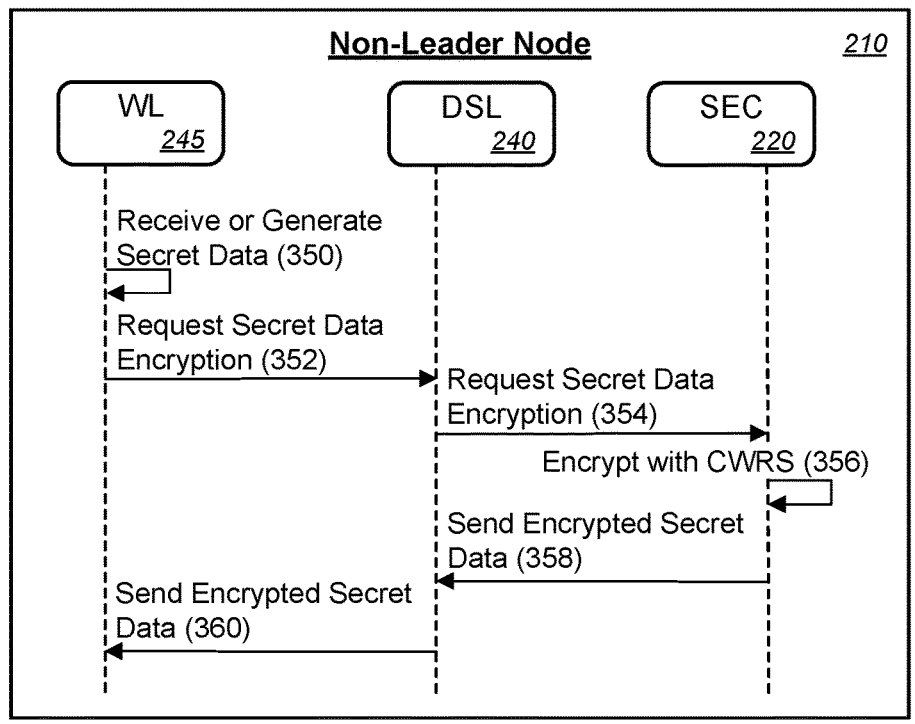
FIGS. 3B and 3C depict example sequence flows for a non-leader node in a multi-node cluster encrypting and decrypting secret data using a CWRS key while implementing the CWRS key for distributed node clusters.
Figure 3C:
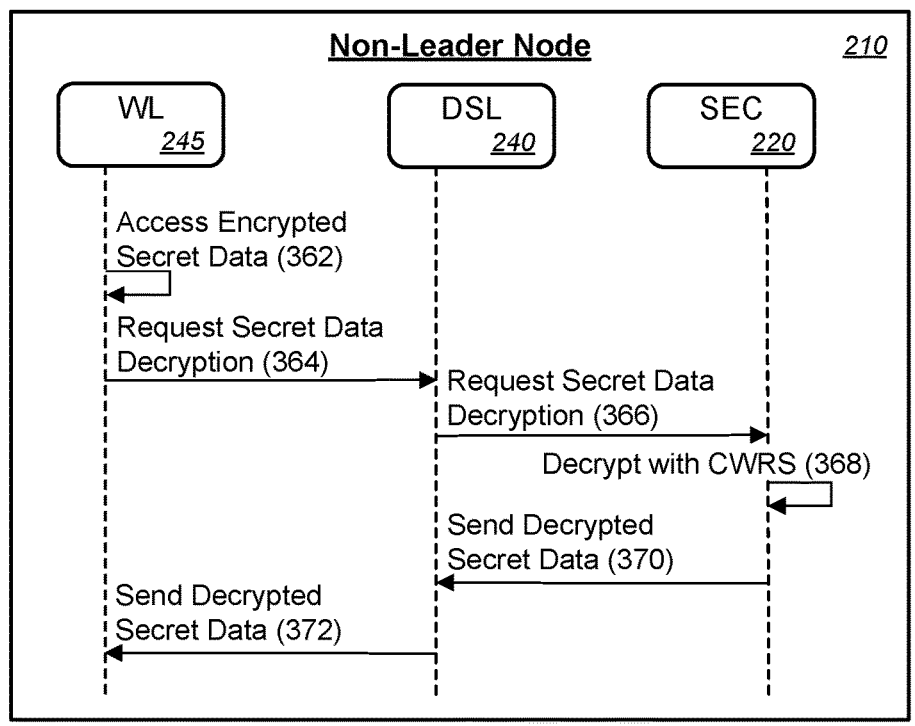

FIGS. 3B and 3C depict example sequence flows 300B and 300C for a non-leader node in a multi-node cluster encrypting and decrypting secret data, respectively, using a CWRS key while implementing the CWRS key for distributed node clusters.

With reference to example sequence flow 300B of FIG. 3B, workload 245, which may include a container or a VM running on non-leader node 210 or may include a server or a data store communicatively coupled to the non-leader node 210, either may receive or may generate secret data (at operation 350). Secret data (also referred to as workload secret(s)), as used herein, refers to any data that is determined to be at least one of personal information (e.g., user-identifying information, health information, financial information, or user login information), data that should be inaccessible to the general public (e.g., business information, health information, financial information), data that is restricted to access by authorized users (e.g., proprietary business information, patient health information, company financial information), authentication data (e.g., passwords, passcodes, or tokens), or other confidential data. In examples, while secret data may be generally applicable to the multi-node cluster, workloads, or servers or computing systems external to workloads and multi-node cluster, workload secrets are focused on the workloads and the multi-node cluster of FIGS. 1-3C. The CWRS key is used as a common secret key (or common private key) that is common across nodes in the multi-node cluster and that is used to encrypt or decrypt either the secret data or the workload secrets.

At operation 352, workload 245 sends a request to encrypt the secret data, via DSL 240. At operation 354, DSL 240 sends or relays the request to encrypt the secret data, from workload 245, to SEC 220. At operation 356, SEC 220 encrypts the secret data using the CWRS, which is accessible only by the leader node security system and security systems of each non-leader node and which is obtained by SEC 220 of the non-leader node 210 based on the processes, e.g., as described above with respect to operations 304-344 of example sequence flow 300A of FIG. 3A. SEC 220 sends the encrypted secret data to DSL 240 (at operation 358), which sends or relays the encrypted secret data back to workload 245 (at operation 360). Alternatively or additionally, the encrypted secret data may be sent to one or more other nodes in the cluster (e.g., one or more other non-leader nodes and/or the leader node). Alternatively or additionally, the encrypted secret data may be stored in at least one of a local data store, a distributed data store, or a cloud storage system.

Similarly, as depicted in example sequence flow 300C of FIG. 3C, workload 245 may access (e.g., receive or retrieve) encrypted secret data (at operation 362). At operation 364, workload 245 sends a request to decrypt the secret data, via DSL 240. At operation 366, DSL 240 sends or relays the request to decrypt the secret data, from workload 245, to SEC 220. At operation 368, SEC 220 decrypts the encrypted secret data using the CWRS, which is described in detail above. SEC 220 sends the decrypted secret data to DSL 240 (at operation 370), which sends or relays the decrypted secret data back to workload 245 (at operation 372). Alternatively or additionally, the decrypted secret data may be sent to one or more other nodes in the cluster (e.g., one or more other non-leader nodes and/or the leader node). Alternatively or additionally, the decrypted secret data may be stored in at least one of a local data store, a distributed data store, or a cloud storage system.

Although workload 245 is shown in FIGS. 3B and 3C as being located (or run) within non-leader node 210, the various embodiments are not so limited, and workload 245 may be located external, yet communicatively coupled with, non-leader node 210.

Figure 4A:
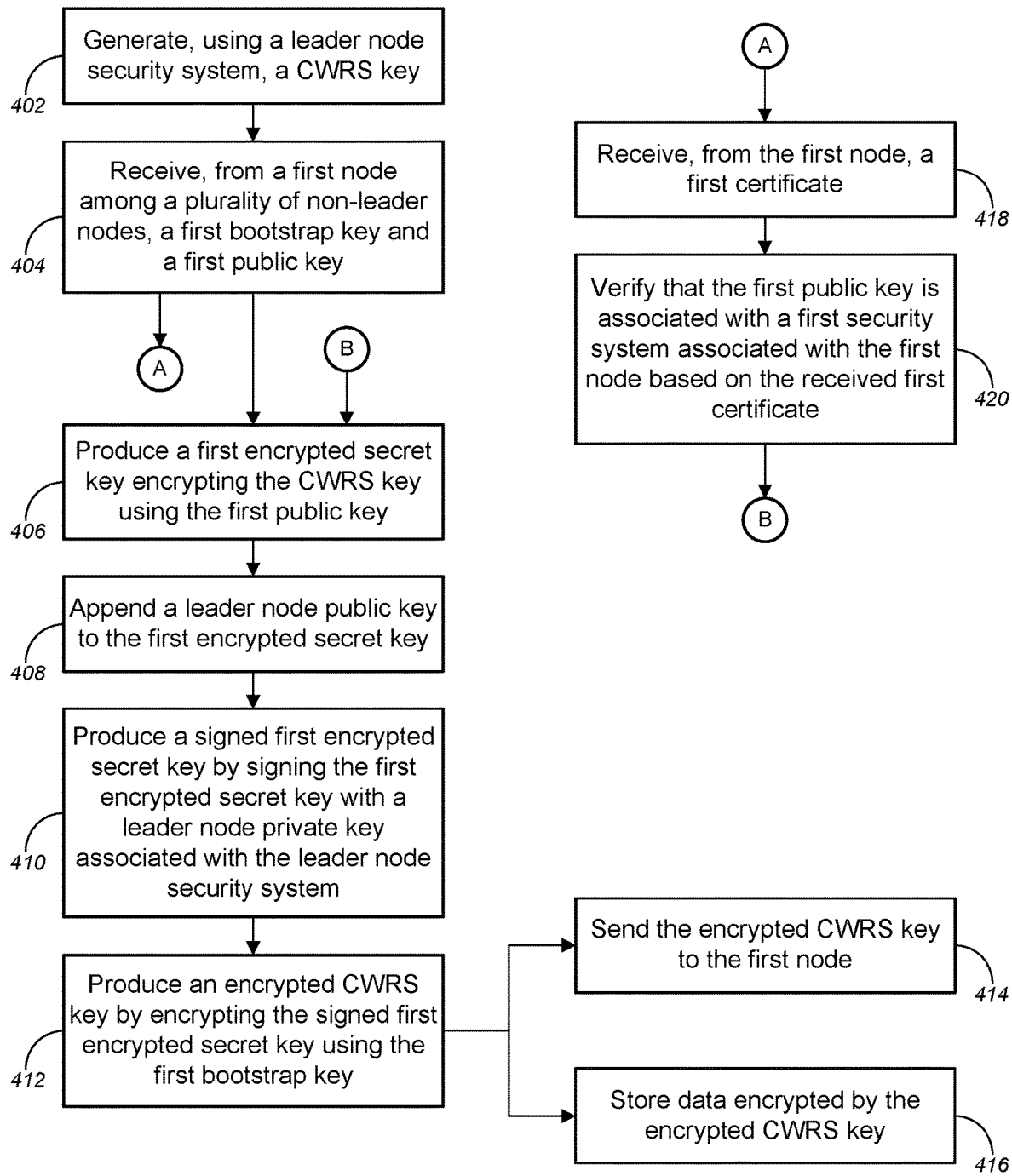
FIGS. 4A-4C depict example methods for implementing a CWRS key for distributed node clusters.
Figure 4B:
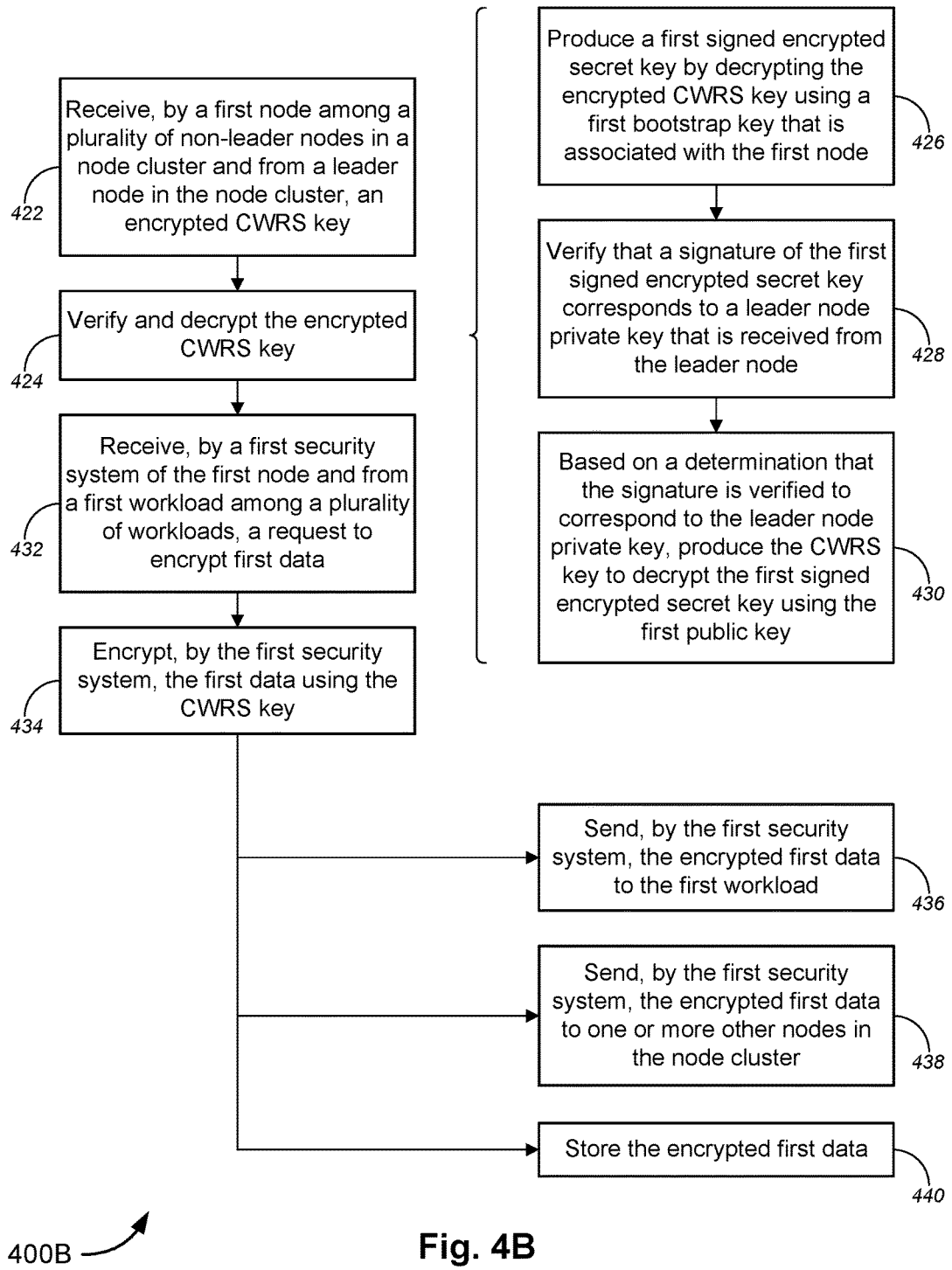
Figure 4C:
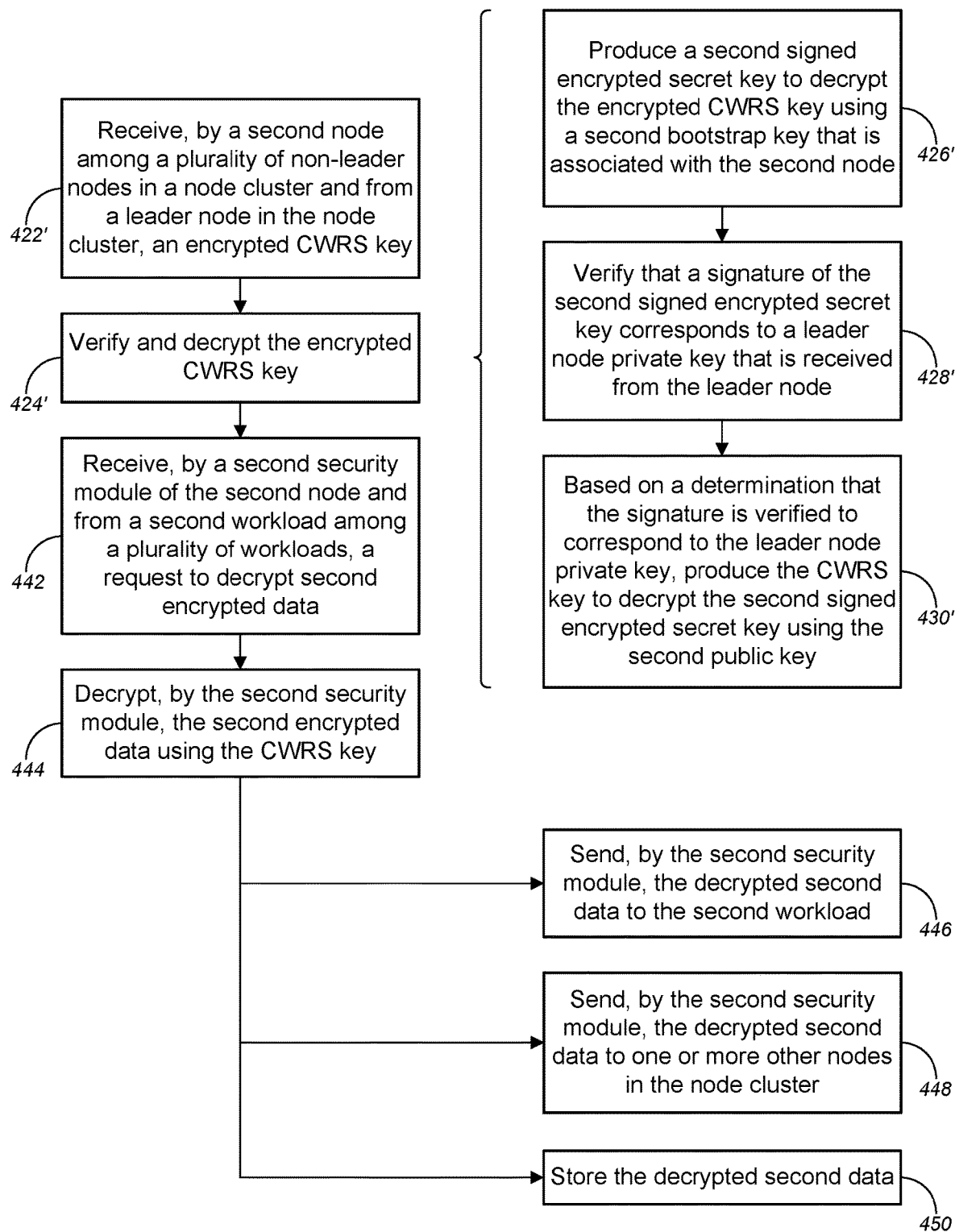

FIGS. 4A-4C depict example methods 400A, 400B, and 400C for implementing a CWRS key for distributed node clusters. The operations of methods 400A, 400B, and 400C may be performed by one or more computing devices or host device components, such as the devices and components discussed in the various device and sequence flow diagrams above. In some examples, the operations of methods 400A, 400B, and 400C are performed by a computing device operating as a leader node or a non-leader node in a multi-node cluster, unless otherwise specifically indicated.

In FIG. 4A, operations 402-420 are directed to an example set of operations for generating, encrypting, and sending a CWRS to a non-leader node in a multi-node cluster while implementing the CWRS key for distributed node clusters, similar to the example sequence flow 300A that is shown and described above with respect to FIG. 3A. In FIG. 4B, operations 422-440 are directed to an example set of operations for a non-leader node in a multi-node cluster encrypting secret data using a CWRS key while implementing the CWRS key for distributed node clusters, similar to the example sequence flow 300B that is shown and described above with respect to FIG. 3B. In FIG. 4C, operations 422'-430' and 442-450 are directed to an example set of operations for a non-leader node in a multi-node cluster decrypting secret data using a CWRS key while implementing the CWRS key for distributed node clusters, similar to the example sequence flow 300C that is shown and described above with respect to FIG. 3C. Although not enumerated in FIG. 4A, some steps, processes, or operations described in FIG. 3A may also be applicable to method 400A of FIG. 4A. Similarly, although not enumerated in FIG. 4B, some steps, processes, or operations described in FIG. 3B may also be applicable to method 400B of FIG. 4B. Likewise, although not enumerated in FIG. 4C, some steps, processes, or operations described in FIG. 3C may also be applicable to method 400C of FIG. 4C.

With reference to FIG. 4A, at operation 402, a leader node security system of a leader node of the multi-node cluster generates a CWRS key, which is described in detail above with respect to FIGS. 1-3C. At operation 404, the leader node security system receives, from a first node among a plurality of non-leader nodes, a first bootstrap key and a first public key. Method 400A either may continue onto the process at operation 406 or may continue onto the process at operation 418, following the circular marker denoted, "A." At operation 418, method 400A includes receiving, from the first node, a first certificate. Method 400A, at operation 420, includes verifying that the first public key is associated with a first security system associated with the first node based on the received first certificate. Method 400A may return to the process at operation 406 following the circular marker denoted, "B."

At operation 406, the leader node security system produces a first encrypted secret key by encrypting the CWRS key using the first public key. At operation 408, the leader node security system appends a leader node public key to the first encrypted secret key. At operation 410, the leader node security system produces a signed first encrypted secret key by signing the first encrypted secret key with a leader node private key associated with the leader node security system. At operation 412, the leader node security system produces an encrypted CWRS key by encrypting the signed first encrypted secret key using the first bootstrap key. In some examples, the leader node security system may then perform one or more of sending the encrypted CWRS key to the first node (at operation 414) and/or storing, in at least one of a local data store (e.g., a TPM or other security controller of the security system of one or more nodes in the multi-node cluster), a distributed data store, or a cloud storage system, data encrypted by the encrypted CWRS key (at operation 416).

FIGS. 4B and 4C depicts a non-leader node in a multi-node cluster encrypting (FIG. 4B) or decrypting (FIG. 4C) secret data using a CWRS key while implementing the CWRS key for distributed node clusters. Referring to operations 422-430 in FIG. 4B (or operations 422'-430' in FIG. 4C), a first (or second) node among the plurality of non-leader nodes in the multi-node cluster receives an encrypted CWRS key (at operation 422 (or operation 422')), and verifies and decrypts the encrypted CWRS key (at operation 424 (or operation 424')). In examples, verifying and decrypting the encrypted CWRS key (at operation 424 (or operation 424')) includes producing a first (or second) signed encrypted secret key by decrypting the encrypted CWRS key using the first (or second) bootstrap key (operation 426 (or operation 426')); verifying that a signature of the first (or second) signed encrypted secret key corresponds to the leader node private key that is received from the leader node (operation 428 (or operation 428')); and based on a determination that the signature is verified to correspond to the leader node private key, producing the CWRS key by decrypting the first (or second) signed encrypted secret key using the first (or second) public key (operation 430 (or operation 430')).

Turning to FIG. 4B, method 400B includes receiving, by a first security system of the first node and from a first workload among a plurality of workloads, a request to encrypt first data (at operation 432). At operation 434, the first security system encrypts the first data using the CWRS key. In examples, the first security system performs at least one of: sending the encrypted first data to the first workload (at operation 436); sending the encrypted first data to one or more other nodes in the multi-node cluster (at operation 438); and/or storing the encrypted first data (at operation 440) in at least one of a local data store (e.g., a TPM or other security controller of the security system of the first node), a distributed data store, or a cloud storage system. In some examples, receiving the request from the first workload (at operation 432), sending the encrypted first data (at operation 436 and/or 438), and storing the encrypted first data (at operation 440) are performed via a DSL (e.g., DSL 125, 225, 235/240a, or 240 of FIG. 1, 2, 3A, or 3B, respectively) that communicatively couples to each node in the multi-node cluster and to each workload among the plurality of workloads. The first workload includes one of a container or a VM running on a node or a server or a data store communicatively coupled to the node, which may be the first node or may be a different node among the multi-node cluster.

Similarly, referring to FIG. 4C, method 400C includes receiving, by a second security system of the second node and from a second workload among the plurality of workloads, a request to decrypt second encrypted data (at operation 442). At operation 444, the second security system decrypts the second encrypted data using the CWRS key. In examples, the second security system performs at least one of: sending the decrypted second data to the second workload (at operation 446); sending the decrypted second data to one or more other nodes in the multi-node cluster (at operation 448); and/or storing the decrypted second data (at operation 450) in at least one of a local data store (e.g., a TPM or other security controller of the security system of the second node), a distributed data store, or a cloud storage system. In some examples, receiving the request from the second workload (at operation 432), sending the decrypted second data (at operation 446 and/or 448), and storing the decrypted second data (at operation 450) are performed via a DSL that communicatively couples to each node in the multi-node cluster and to each workload among the plurality of workloads. The second workload, like the first workload of FIG. 4B, includes one of a container or a VM running on a node or a server or a data store communicatively coupled to the node, which may be the second node or may be a different node among the multi-node cluster.

While the techniques and procedures in methods 400A, 400B, and 400C are depicted and/or described in a certain order for purposes of illustration, it should be appreciated that certain procedures may be reordered and/or omitted within the scope of various embodiments. Moreover, while the methods 400A, 400B, and 400C may be implemented by or with (and, in some cases, are described below with respect to) the systems, examples, or embodiments 100, 200, 300A, 300B, and 300C of FIGS. 1, 2, 3A, 3B, and 3C, respectively (or components thereof), such methods may also be implemented using any suitable hardware (or software) implementation. Similarly, while each of the systems, examples, or embodiments 100, 200, 300A, 300B, and 300C of FIGS. 1, 2, 3A, 3B, and 3C, respectively (or components thereof), can operate according to the methods 400A, 400B, and 400C (e.g., by executing instructions embodied on a computer readable medium), the systems, examples, or embodiments 100, 200, 300A, 300B, and 300C of FIGS. 1, 2, 3A, 3B, and 3C can each also operate according to other modes of operation and/or perform other suitable procedures.

Figure 5:
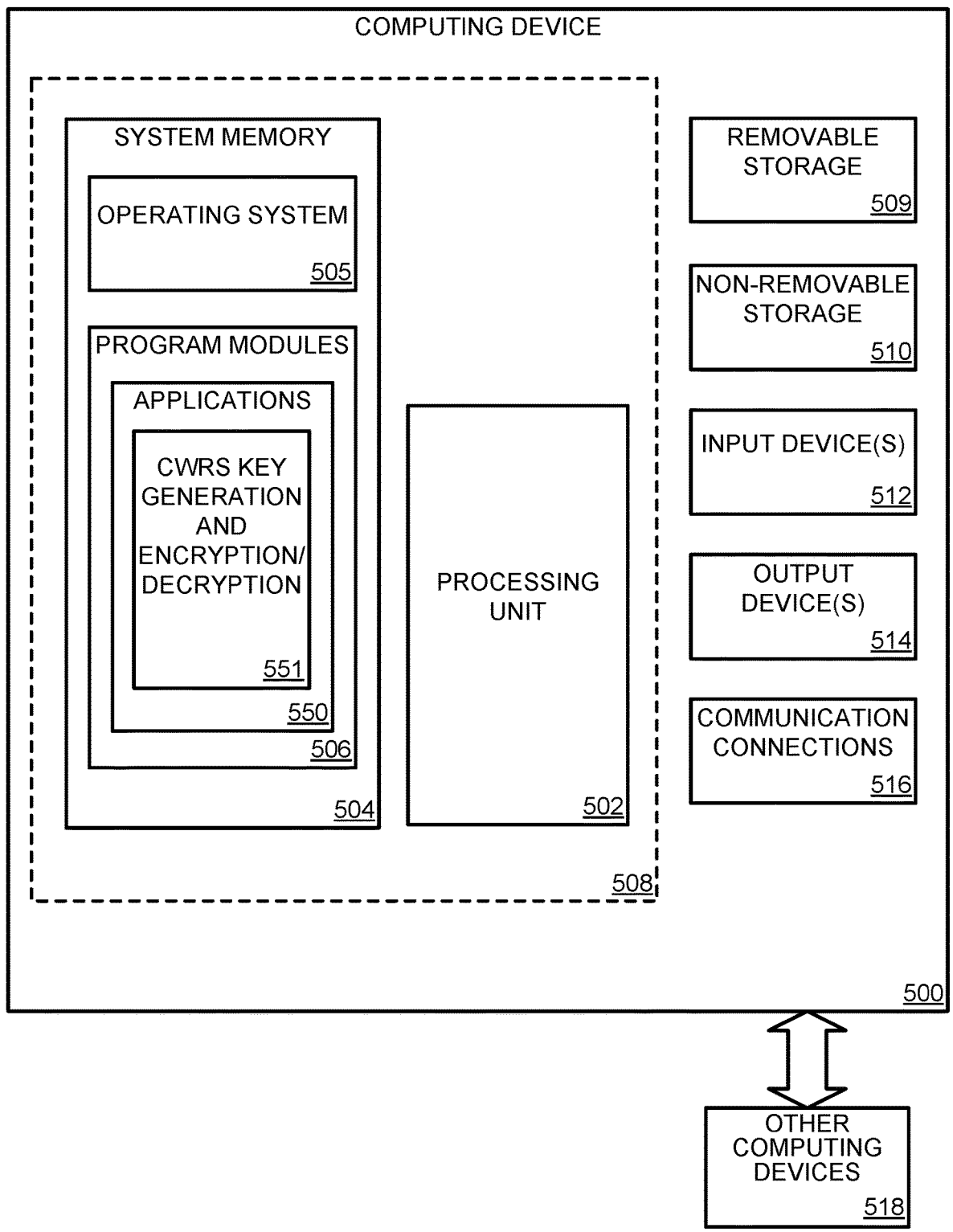
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the CWRS key for distributed node clusters, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as CWRS key generation and encryption/decryption system 551, to implement one or more of the systems or methods described above.

The operating system 505, for example, may be suitable for controlling the operation of the computing device 500. Furthermore, aspects of the present technology may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A-4C, or one or more operations of the system(s) and/or apparatus(es) as described with respect to FIGS. 1-3C, or the like. Other program modules that may be used in accordance with examples of the present disclosure may include applications such as electronic mail and contacts applications, word processing applications, spreadsheet applications, database or data store applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein includes computer storage media. Computer storage media includes volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (also referred to as memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible. Computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" describes a signal that has one or more characteristics that are set or changed in such a manner as to encode information in the signal. By way of example, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, encrypting or decrypting secret data within a multi-node cluster of a distributed system of multi-node clusters generally raises multiple technical problems. For instance, one technical problem includes secret keys used for encryption and decryption of such secret data being specific to individual nodes within the multi-node cluster, where such secret keys are not shared or synchronized across the nodes. A related problem arises where migration of workloads (e.g., containers or VMs) from a first node to a second node occur, either for optimization purposes, because the first node is failing or has failed, or for other reasons. In such cases, because the secret keys are particular to each node, the migrated workload running on the second node can no longer access secret data encrypted using the secret key of the first node. At least due to these reasons, approaches that utilize such node-specific secret keys are not scalable as the number of nodes within the multi-node cluster increases.

The present technology provides a CWRS key that is a common secret key for all workloads (e.g., containers, virtual machines ("VMs"), servers, or databases or data stores) in the multi-node cluster. Sharing of the CWRS key is made secure by using a leader node security system of a leader node in the multi-node cluster to encrypt the CWRS key, which is generated by the leader node security system, using a public key and/or a bootstrap key that are received from a non-leader node that is requesting the CWRS key. In such a case, only the security system of the requesting node can decrypt (and subsequently use) the encrypted CWRS key. The CWRS key is stored either locally in the security system (e.g., TPM or other security controller) or in a distributed data store or a cloud storage that is only accessible by the leader node security system or security system of one or more nodes in the multi-node cluster (including the requesting node). In this manner, efficiency and flexibility of encryption and/or decryption may be achieved with the use of the CWRS key, while maintaining security by the secure manner in which the CWRS key is generated, shared, and stored. In addition, scalability can be achieved as the number of nodes in the multi-node cluster increases, while allowing for ease of migration of workloads throughout the multi-node cluster, as the common secret key (e.g., the CWRS key) is used across most (if not all) the nodes in the multi-node cluster.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification of an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present technology may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the present technology, as other embodiments of the present technology may omit such features. The detailed description is, therefore, not to be taken in a limiting sense.

Aspects of the present technology, for example, are described above with reference to block diagrams and/or operational illustrations of methods, systems, and computer program products according to aspects of the present technology. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the present technology as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
   a hardware processor; and
   a multi-node cluster comprising a leader node and a plurality of non-leader nodes, the leader node comprising:
   a leader node security system configured to perform operations comprising:
   receiving, from a first node among the plurality of non-leader nodes, a first bootstrap key and a first public key;
   producing a first encrypted secret key by encrypting a cluster-wide root secret ("CWRS") key using the first public key;
   producing a signed first encrypted secret key by signing the first encrypted secret key with a leader node private key associated with the leader node security system;
   producing a first encrypted CWRS key by encrypting the signed first encrypted secret key using the first bootstrap key; and
   sending the first encrypted CWRS key to the first node.

2. The system of claim 1, wherein the operations further comprise:
generating, using the leader node security system, the CWRS key, the CWRS key being a common key that is used by nodes in the multi-node cluster to encrypt or decrypt data, the CWRS key being accessible only by the leader node security system and security systems of each non-leader node.

3. The system of claim 2, wherein the CWRS key is updated in a manner that is one of in response to a condition being satisfied, in response to a user-initiated trigger, periodic, or random.

4. The system of claim 1, wherein sending the first encrypted CWRS key to the first node comprises sending the first encrypted CWRS key via a distributed secrets layer ("DSL") that communicatively couples to each node in the multi-node cluster.

5. The system of claim 1, wherein the operations further comprise:
prior to signing the first encrypted secret key, appending a leader node public key to the first encrypted secret key.

6. The system of claim 1, wherein the operations further comprise:
receiving, from the first node, a first certificate; and
verifying that the first public key is associated with a first security system associated with the first node based on the first certificate.

7. The system of claim 6, wherein the first node comprises:
the first security system that is configured to perform first node operations comprising:
producing a signed second encrypted secret key by decrypting the first encrypted CWRS key using the first bootstrap key;
verifying that a signature of the signed second encrypted secret key corresponds to the leader node private key that is received from the leader node; and
based on verifying the signature of the signed second encrypted secret key, producing the CWRS key by decrypting the signed second encrypted secret key using the first public key.

8. The system of claim 7, wherein the first node operations further comprise:
receiving, from a workload, a request to encrypt or decrypt data, wherein the workload comprises one of a container or a virtual machine ("VM") running on a node among the multi-node cluster or a server or a data store communicatively coupled to the node.

9. The system of claim 8, wherein the node among the multi-node cluster is the first node.

10. The system of claim 1, wherein the operations further comprise:
receiving, from a second node among the plurality of non-leader nodes, a second bootstrap key and a second public key;
producing a third encrypted secret key by encrypting the CWRS key using the second public key;
producing a signed third encrypted secret key by signing the third encrypted secret key with the leader node private key associated with the leader node security system;
producing second encrypted CWRS key by encrypting the signed third encrypted secret key using the second bootstrap key, the second encrypted CWRS key being the same as the first encrypted CWRS key; and
sending the second encrypted CWRS key to the second node.

11. The system of claim 10, wherein sending the first encrypted CWRS key to the first node or sending the second encrypted CWRS key to the second node comprises sending the first encrypted CWRS key or the second encrypted CWRS key via a distributed secrets layer ("DSL") that communicatively couples to each node in the multi-node cluster.

12. The system of claim 1, wherein the operations further comprise:
storing, in at least one of a distributed data store or a cloud storage system, data encrypted by the first encrypted CWRS key.

13. A computer-implemented method, comprising:
receiving, by a leader node and from a first node among a plurality of non-leader nodes, a first bootstrap key and a first public key;
producing a first encrypted secret key by encrypting a cluster-wide root secret ("CWRS") key using the first public key;
producing a signed first encrypted secret key by signing the first encrypted secret key with a leader node private key associated with a leader node security system;
producing a first encrypted CWRS key by encrypting the signed first encrypted secret key using the first bootstrap key; and
sending the first encrypted CWRS key to the first node.

14. The method of claim 13, further comprising:
generating, using the leader node security system, the CWRS key, the CWRS key being a common key that is used by nodes in a multi-node cluster to encrypt or decrypt data, the CWRS key being accessible only by the leader node security system and security systems of each non-leader node.

15. The method of claim 14, wherein the CWRS key is updated in a manner that is one of in response to a condition being satisfied, in response to a user-initiated trigger, periodic, or random.

16. The method of claim 13, wherein sending the first encrypted CWRS key to the first node comprises sending the first encrypted CWRS key via a distributed secrets layer ("DSL") that communicatively couples to each node in a multi-node cluster.

17. The method of claim 13, further comprising:
prior to signing the first encrypted secret key, appending a leader node public key to the first encrypted secret key.

18. The method of claim 13, further comprising:
receiving, from the first node, a first certificate; and
verifying that the first public key is associated with a first security system associated with the first node based on the first certificate.

19. The method of claim 18, wherein the first node comprises:
the first security system that is configured to perform first node operations comprising:
producing a signed second encrypted secret key by decrypting the first encrypted CWRS key using the first bootstrap key;
verifying that a signature of the signed second encrypted secret key corresponds to the leader node private key that is received from the leader node; and
based on verifying the signature of the signed second encrypted secret key, producing the CWRS key by decrypting the signed second encrypted secret key using the first public key.

20. A multi-node cluster, comprising:
a hardware processor; and
a leader node and a plurality of non-leader nodes, the leader node comprising:
a leader node security system configured to perform operations comprising:
receiving, from a first node among the plurality of non-leader nodes, a first bootstrap key and a first public key;
producing a first encrypted secret key by encrypting a cluster-wide root secret ("CWRS") key using the first public key;
producing a signed first encrypted secret key by signing the first encrypted secret key with a leader node private key associated with the leader node security system;
producing a first encrypted CWRS key by encrypting the signed first encrypted secret key using the first bootstrap key; and
sending the first encrypted CWRS key to the first node.

* * * * *